Oct. 20, 1953  W. C. SEALEY  2,656,403
GROMMETED LEAD PANEL FOR OIL-FILLED ELECTRICAL APPARATUS
Filed April 24, 1950
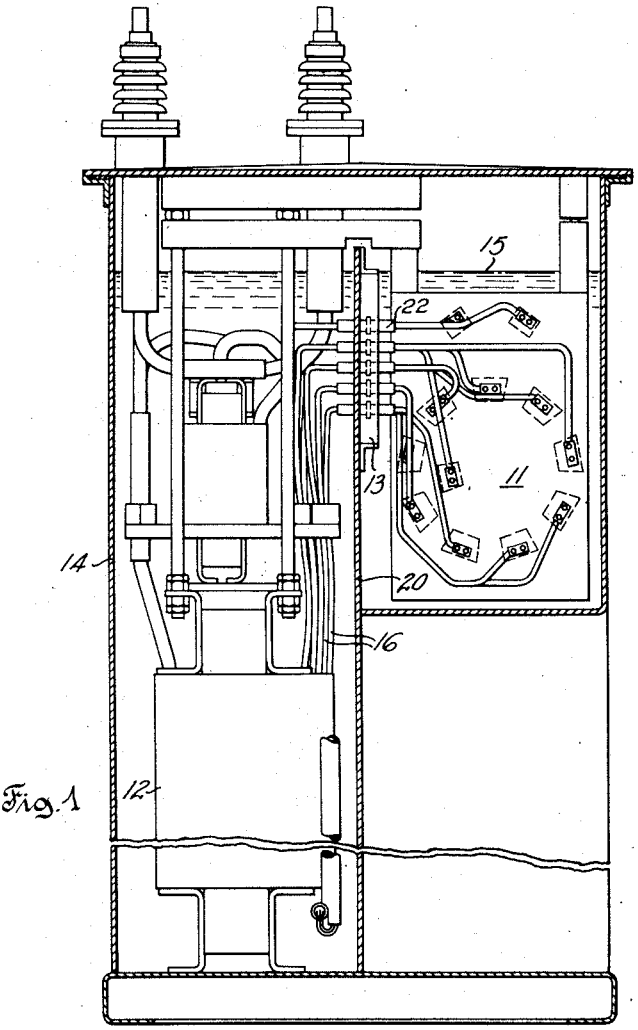
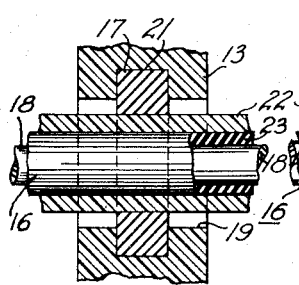
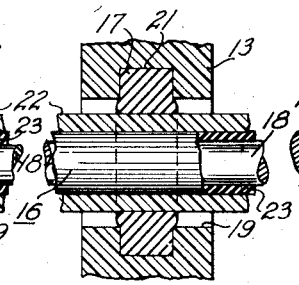
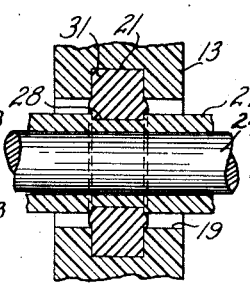
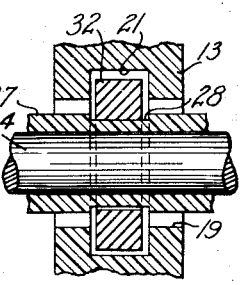
Inventor
William C. Sealey
by Joseph E. Kerwin
Attorney Patented Oct. 20, 1953

2,656,403

UNITED STATES PATENT OFFICE 2,656,403

GROMMETED LEAD PANEL FOR OIL-FILLED ELECTRICAL APPARATUS

William C. Sealey, Wauwatosa, Wis., assignor to Allis-Chalmers Manufacturing Company, Milwaukee, Wis.

Application April 24, 1950, Serial No. 157,831

3 Claims. (Cl. 174—18)

This invention relates to panels having grommeted lead holes to guide and to hold articles such as electrical conductors which extend through the panel.

In electrical apparatus it is frequently necessary to lead an electrical conductor from an electrical device in one compartment through a fixed barrier or panel to a second compartment of the apparatus or to the outside of the apparatus. In the barrier in such apparatus it is desirable to provide a resilient bushing or grommet to guide, protect and hold the conductor. It is often necessary to extend many electrical conductors through the barrier closely adjacent each other. It is important to provide a structure which involves the minimum of expense, to avoid parts such as clamping members, to keep the size of the grommet a minimum, and preferably to utilize a one piece barrier of solid insulation material.

It is therefore an object of the present invention to provide an improved grommeted lead panel for electrical conductors that can be manufactured and assembled at a low cost.

It is also an object of the present invention to provide a grommeted lead panel of solid insulation material in which the grommets are substantially contained within the panel.

Still another object of the present invention is to provide a grommet for use with electrical conductors which can be substantially contained within a panel through which the conductor extends.

And another object is to provide a grommet for articles extending through a barrier wherein there is a labyrinth passage which slows up the exchange of liquid from one side of the barrier to the other side thereof and which prevents the exchange of solid particles through the barrier.

Objects and advantages other than those above set forth will be apparent from the following description when read in connection with the accompanying drawing in which:

Fig. 1 is a view in section of an electrical induction apparatus showing a preferred embodiment of this invention constituting the barrier between the tap changing equipment and the transformer of the electrical induction apparatus;

Fig. 2 is an enlarged view partly in section of a portion of the barrier shown in Fig. 1 illustrating one of the electrical conductors extending through the barrier from the transformer to the tap changer;

Fig. 3 illustrates the grommeted barrier portion shown in Fig. 2, with the grommet swelled slightly by liquid insulation; and Figs. 4 and 5 are views similar to Fig. 2 illustrating modifications of the grommeted barrier.

In Fig. 1 an electrical induction apparatus is illustrated. Contained within the casing 14 of this apparatus is electrical apparatus consisting of a transformer 12 and tap changer mechanism 11. Both the transformer and the tap changer are immersed in liquid insulation material 15 such as mineral oil. A barrier 20 divides the casing in order to prevent the interchange of the insulating liquid from the tap changing compartment to the transformer compartment. The separation into two compartments is desirable as the opening and closing of the tap changing switches may carbonize the insulating liquid. Also the two compartments may contain different dielectrics or there may be liquid dielectric in only one of the compartments.

The barrier 20 includes a metal wall and a grommeted lead panel 13 through which articles such as electrical conductive leads 16 extend from the transformer to the tap changer. The portions of the conductive leads extending through the panel may be surrounded by insulating bushings 22 as shown in Fig. 1. The lead panel 13 provides a flexible support and guide for the electrical conductive leads. The lead panel is made of any suitable solid insulation material such as wood or laminated synthetic resin and is attached to the metal wall by any suitable means (not shown) such as bolts. As shown in Fig. 2, it is provided with bores 19 through which the electrical conductive leads extend. An annular recess 21 is formed in each bore 19 coaxially therewith. This annular recess is positioned approximately midway between the two outer surfaces of the panel 13. The recess recedes from the sides of the bore in a direction normal to the axis of the bore. That is, the recess has a rectangular cross section with parallel opposite sides in planes substantially normal to the axis of the bore. A washer-shaped, or annular, grommet 17 having flat opposite surfaces and made of resilient oil-resisting material, such as synthetic rubber is placed in the annular recess by squeezing the flexible grommet and forcing it into the bore and recess. An insulating bushing 22 is pushed partly through the opening in the grommet 17. A conductive lead 16 comprising a conductor 18 having insulation 23 surrounding the conductor is then inserted through the bushing 22 and the panel. The insulation 23 may be adhered to or may be loose on the conductor. The inner edge portion of the grommet extends out of the recess 21 into the bore 19 to receive the bushing, and the outer peripheral edge of the grommet is in contact with the bottom of the recess. The grommet provides means to restrain the movement of the conductive lead or bushing relative to the panel as well as acting as a strain reliever for the conductor.

Although the grommet 17 is preferably made of oil-resisting material and is exposed to very little of the liquid insulation, it may be desirable to use a material which permits limited swelling or expansion of the grommet within a short period of time after immersion in the liquid insulation. An expanded grommet is illustrated by Fig. 3. By so doing, advantage is taken of the almost complete enclosing of the grommet whereby the flow or swelling of grommet material aids in firmly fixing the grommet in the panel and against the bushing. This arrangement is particularly useful in apparatus where it is desirable to give more rigidity to the grommeted structure without adding clamping means or where a seal is desired between the two chambers.

In the modification illustrated in Fig. 4 the conductive lead includes a conductor 24 having rigid insulation 27 and is provided with an annular groove 28 on the external surface thereof. The bushing has been omitted in the embodiments shown in Figs. 4 and 5. The lead is placed in the panel 13 with the groove 28 in alignment with the annular recess 21 and with the grommet 31 fitting into the groove in the insulation as well as into the recess in the panel. The material of the grommet swells in the liquid insulation and thereby firmly clamps the conductive lead. This arrangement provides means for limiting the movement of the insulated conductor relative to the panel.

The modification shown in Fig. 5 is similar to that of Fig. 4 except that grommet 32 is loosely retained by the annular groove in the insulation and the annular recess in the panel. The grommet may substantially float in the panel by providing the conductive lead with sufficient rigidity and support means separate from the grommet and panel. The modification illustrated in Fig. 5 permits some interchange of oil between the two compartments through the labyrinth passages between the grommet and insulation or between the grommet and panel but the labyrinth passage thus provided prevents the passing of solid particles therethrough.

It is to be particularly noted that no clamping structure is required to retain the grommet in the embodiments herein illustrated. The grommet is held by the panel itself. The lead panel may be slit or made in sections provided with co-operative semicircular openings in each section defining the bores for receiving the grommets. When panels are assembled of such sections, the semicircular openings must align properly and clamps or bolts may be used to build up the panel. However, the construction may be simplified by using a solid one piece panel provided with a resilient grommet which can be pressed into the panel opening and held therein.

It is also a particular advantage of the present invention that the grommets are all retained within the lead panel itself. Since the grommets do not extend outside the panel and since no clamping means are needed, the overall space required for a panel structure having a great number of conductors extending therethrough is reduced and the appearance of the lead panel is considerably improved.

Also since the resilient grommets are not rigidly clamped more freedom of movement of the grommets is possible so that the conductors are not under any undue strain.

Although but a few embodiments of the present invention have been illustrated and described, it will be apparent to those skilled in the art that various changes and modifications may be made therein without departing from the spirit of the invention or the scope of the appended claims.

It is claimed and desired to secure by Letters Patent:

1. An electrical apparatus comprising a casing having a first compartment and a second compartment, insulating liquid substantially filling said compartments, a barrier separating said compartments, an insulated electrical conductive lead extending from said first compartment to said second compartment through said barrier, said barrier consisting of a panel member of solid material separating said two compartments, an aperture through said panel, a recess coaxial with and receding from the peripheral surface of said aperture, said recess being approximately midway between opposite sides of said panel, a flexible ring-shaped grommet, said lead extending through a central opening of said grommet, insulation material adhered to and surrounding said lead with an annular groove in the insulation coaxial with the lead, said groove and said recess aligned between the opposite sides of said panel, said grommet positioned with its outer peripheral edge in said recess and with its inner portion fitting into said annular groove, said grommet cooperating with said recess and groove to provide a labyrinth passageway for said liquid preventing solid particles from passing from one of said compartments to the other of said compartments through said barrier.

2. An electrical apparatus comprising a casing having a first compartment and a second compartment, insulating liquid substantially filling said compartments, at least one electrical conductor extending from said first compartment to said second compartment, a panel of solid insulating material separating said first and second compartments, said panel having an aperture and an annular recess coaxial with and receding from said aperture, said recess having opposite sides substantially normal to the axis of said aperture, a flexible washer shaped grommet wholly contained within said panel and disposed partly in said recess and partly in said aperture, said grommet having two opposite flat surface portions which abut said opposite flat sides of said recess, said conductor extending through said aperture and supported out of contact with said panel by said grommet.

3. An electrical apparatus comprising a casing having a first compartment and a second compartment, insulating liquid substantially filling said compartments, at least one electrical conductor extending from said first compartment to said second compartment, a panel of solid insulation material separating said first and second compartments, said panel having an aperture and an annular recess coaxial with and receding from said aperture, said recess having opposite sides substantially normal to the axis of said aperture, a flexible washer shaped grommet wholly contained within said panel and disposed partly in said recess and partly in said aperture, said grommet having two opposite flat surfaces abutting said flat sides of said recess, said grommet being composed of material capable of swelling when in contact with said insulating liquid, said conductor extending through said aperture supported by said grommet out of contact with said panel and firmly clamped by the swelling of said grommet in said liquid.

WILLIAM C. SEALEY.

References Cited in the file of this patent

UNITED STATES PATENTS

| Number | Name | Date |
|---|---|---|
| 1,027,400 | Deibel | May 28, 1912 |
| 1,329,917 | Marko | Feb. 3, 1920 |
| 2,249,091 | Robinson et al. | July 15, 1941 |
| 2,264,803 | Jacobs | Dec. 2, 1941 |
| 2,291,430 | Ingersoll | July 28, 1942 |
| 2,362,963 | Lee | Nov. 14, 1944 |
| 2,363,364 | Rugg | Nov. 21, 1944 |
| 2,406,852 | Relf | Sept. 3, 1946 |
| 2,414,836 | Rickmeyer | Jan. 28, 1947 |
| 2,427,742 | Peterson et al. | Sept. 23, 1947 |
| 2,591,044 | Bomhardt et al. | Apr. 1, 1952 |

FOREIGN PATENTS

| Number | Country | Date |
|---|---|---|
| 6,983 | England | of 1911 |

OTHER REFERENCES

Cowie, D. B.: Rev. Sc. Insts., February 1944, pp. 46, 47.